Patented Mar. 3, 1942

2,274,639

UNITED STATES PATENT OFFICE 2,274,639

PROCESS FOR THE PRODUCTION OF HYDROCARBONS

Arno Scheuermann, Klaus Meisenheimer, and Arnold Kotzschmar, Ludwigshafen-on-the-Rhine, Germany, assignors, by mesne assignments, to Standard Catalytic Company, a corporation of Delaware No Drawing. Application March 1, 1940, Serial No. 321,692. In Germany February 11, 1939

8 Claims. (Cl. 260—449)

The present invention relates to a process for the production of hydrocarbons with more than one carbon atom in the molecule by conversion of carbon monoxide with hydrogen in the presence of catalysts.

It is already known to carry out this conversion under atmospheric pressure, reduced pressure or increased pressure, in the presence of catalysts containing metals of the iron group, or their compounds, especially catalysts containing cobalt together with additions of activating substances. These catalysts are generally employed on carriers, such as diatomaceous earth and the like. In the preparation of cobalt catalysts the cobalt has usually been rapidly precipitated at elevated temperature in the form of a reducible compound from a solution of one of its salts, the precipitate being subsequently subjected to a reducing treatment with hydrogen or gases containing hydrogen.

We have now found that in the conversion of carbon monoxide with hydrogen into hydrocarbons with more than one carbon atom in the molecule improved results are obtained when working in the presence of cobalt containing catalysts, in the preparation of which a reducible cobalt compound is gradually precipitated from a solution of a cobalt salt during a period of at least 3 hours.

Preferably the gradual precipitation takes at least 12 hours, and periods of 24, 48 or more hours are advantageously employed.

In the preparation of the catalysts according to the present invention the precipitating agent is added to the solution of a cobalt salt gradually and slowly and preferably continuously, for example, drop by drop. The solution is advantageously agitated during the precipitation, for example, by stirring, and is preferably maintained at room temperature. The precipitation may also be carried out in the reversed way by adding the cobalt salt solution drop by drop to the solution of the precipitating agent.

The precipitate obtained is separated and washed, preferably with cold water, and dried, for example, at 110° C., while exposed to the atmosphere or in a stream of carbon dioxide or any other inert gas. The dried material is subsequently subjected to a reducing treatment with hydrogen or gases containing hydrogen.

Apart from cobalt the catalysts employed according to the present invention may also contain iron and/or nickel. In the preparation of these mixed catalysts advantageously a solution is prepared containing a cobalt salt together with an iron salt and/or a nickel salt from which solution reducible compounds of the said metals are precipitated in the same manner as described above for cobalt.

Substances having an activating action may also be added before, during or after the precipitation of the cobalt compound, for example, thorium oxide, magnesium oxide, aluminum oxide and other metal oxides which are not reducible under the reaction conditions of the conversion of carbon monoxide with hydrogen to hydrocarbons. The beneficial effect obtained by the method of slow and gradual precipitation according to the present invention is, however, particularly evident when employing catalysts which are free from the said activating substances. Said activating substances, when used at all, are preferably used only in a total amount of not more than 8 per cent by weight, advantageously not more than 3 per cent by weight of the cobalt or the mixture thereof with iron and/or nickel, present in the catalyst.

The catalysts may, if desired, be employed on carriers such as diatomaceous earth and the like.

With the catalysts employed in accordance with the present invention the total yield of liquid and solid products is equal to the highest yields which can be obtained with the known catalysts. In addition the catalysts prepared according to the present invention retain a high activity for a considerably longer time than the cobalt catalysts prepared as hitherto known. Even after weeks of operation a regeneration is not yet necessary. The regeneration of catalysts which, after a long period of operation, have become less active may be effected in known manner, for example, by a treatment with hydrogen or by an extraction with solvents.

The catalysts prepared according to the present invention are rather soft as compared with catalysts having the same composition obtained by rapid precipitation as hitherto known and therefore they are preferably pressed into pills, pellets, tablets or any other suitable form. This is in practice carried out before the reducing treatment. The bulk density of the catalyst is increased by pressing so that a considerably larger weight of catalysts can be arranged in the conversion chamber and, as the pressing does not impair the activity of the catalyst, the output per unit of catalyst space and per unit of time is considerably improved as compared with the output obtained when using catalysts which have not undergone a pressing operation.

The conversion of the carbon monoxide with hydrogen is usually carried out at temperatures between 160° and 250° C., advantageously between 180° and 210° C.

When carrying out the conversion with the intension to produce low boiling hydrocarbons the present invention gives particularly beneficial results in that when working under atmospheric pressure or slightly increased pressures, up to about 2 atmospheres, the reaction products obtained consist for about 75 per cent by weight of hydrocarbons boiling below 200° C., whereas when employing catalysts prepared as hitherto usual only about 60 per cent by weight of the reaction products have a boiling point within the said range. Under these conditions hardly any paraffin wax is formed.

The life of the catalyst prepared according to the present invention is considerably longer than that of the catalysts prepared as hitherto known, i. e. they retain their high activity for the production of low boiling hydrocarbons for a considerably longer time. This is probably due to the fact that the catalysts according to the present invention, even after an operation period of several weeks, only contain about 10 to 30 per cent by weight of paraffin wax based on the catalyst weight, whereas the catalysts hitherto known after the same period of operation would contain about 100 per cent by weight of paraffin wax.

Also when it is desired to produce heavier hydrocarbons which are solid at room temperature as paraffin wax, the present invention avails of effecting a marked improvement in yields. In this case higher pressures are employed in practice which generally range between 5 and 50 atmospheres, advantageously between 10 and 25 atmospheres and mainly hydrocarbons which are solid at room temperature, particularly paraffin wax, are obtained.

Also in the preparation of hydrocarbons solid at room temperature the catalysts prepared according to the present invention retain their activity for a very long time.

The following examples will further illustrate the nature of the said invention and in what manner the same can be carried out in practice, but it should be understood, that the invention is not limited to the said examples.

Example 1

A solution of 45 grams of potassium carbonate in 800 cubic centimeters of water is slowly and gradually added, while stirring, during a period of 50 hours to a solution of 60 grams of cobalt nitrate $Co(NO_3)_2.6H_2O$ in 800 cubic centimeters of water which contains 15 grams of diatomaceous earth in suspension. The precipitate obtained is separated by filtration, washed and dried at 110° C. An amount of the resulting product corresponding to 4 grams of cobalt, is arranged in a tube having a diameter of 14 millimeters. After reduction with hydrogen at 350° C. and under atmospheric pressure, the temperature is lowered to about 180° C. and subsequently a mixture of carbon monoxide and hydrogen $(CO:H_2=1:2)$ is passed over the catalyst at a rate of about 4 liters per hour. In the course of some weeks the temperature is raised to about 210° C. The yields of liquid and solid products which are obtained are indicated in the following table, in which the said yields are expressed in cubic centimeters per cubic meter of the initial mixture of carbon monoxide and hydrogen (measured at room temperature and under atmospheric pressure). The said yields are compared with the yields obtained under similar conditions with a catalyst which, apart from cobalt, also contains thorium oxide and which has been obtained in known manner by rapid precipitation at boiling temperature.

| Catalyst | Cobalt on diatomaceous earth | Cobalt and thorium oxide on diatomaceous earth |
|---|---|---|
| Highest yield with a throughput of 1 liter of gas per hour and per gram of cobalt in ccm./m.³ | 145 | 145 |
| Period of operation _____days__ | 108 | 54 |
| Yield in ccm./m.³ | ¹ 118 | ² 110 |
| Decrease of the yield_____percent__ | 18.6 | 24.2 |
| Percentage of conversion products boiling up to 200° C | 79 | 61 |
| Weight of the catalyst_____grams__ | 10 | 11 |
| Amount of paraffin wax in the catalyst grams__ | 1.7 | 12.8 |

¹ After 108 days.
² After 54 days.

Example 2

A number of cobalt catalysts without activating additions were prepared in the manner as indicated in Example 1, the duration for the precipitation being extended to respectively 3, 6, 12 and 24 hours. Another catalyst was prepared by rapid precipitation. The average yields of solid and liquid products obtained by the conversion of carbon monoxide with hydrogen in the presence of these catalysts during a period of 14 days while working under similar conditions (180 to 210° C., a throughput of 1 liter gas per hour per gram of cobalt present in the catalyst) are indicated in the following table:

| Precipitation time in hours | Yield in cubic centimeters per cubic meter of gas |
|---|---|
| 0 | 99 |
| 3 | 104 |
| 6 | 111 |
| 12 | 128 |
| 24 | 132 |

With the catalyst obtained according to Example 1 by precipitation during 50 hours, an average yield of 138 cubic centimeters per cubic meter of gas was obtained under the same conditions and within the same conversion period.

Example 3

A solution of 45 grams of potassium carbonate in 800 cubic centimeters of water is slowly and gradually added, while stirring, during a period of 50 hours to a solution of 60 grams of cobalt nitrate $Co(NO_3)_2.6H_2O$ in 800 cubic centimeters of water, which contains 15 grams of diatomaceous earth in suspension. The precipitate thus formed is separated by filtration, washed and then dried at 110° C. The resulting product is pressed, without addition of water, to granules having a diameter of 1 to 2 millimeters and then arranged in a pressure tube having a diameter of 10 millimeters. After reduction with hydrogen at 350° C. under atmospheric pressure, the temperature is lowered and subsequently a mixture of carbon monoxide and hydrogen $(CO:H_2=1:2)$ under a pressure of 12 atmospheres is passed through the tube. The temperature suitable for the production of high boiling hydrocarbons in the present case ranges between 180° and 200° C. The following yields of liquid and solid products are obtained, which yields are expressed in grams per cubic meter of the initial mixture of carbon monoxide and hydrogen measured under normal conditions of temperature and pressure. During 6 weeks of operation with a throughput of 1 liter of gas per gram of cobalt per hour 140 grams of liquid and solid products are obtained, of which 103 grams=73.5 per cent are solid at room temperature (boiling point above 300° C.), while with a throughput of 2 liters of gas per gram of cobalt per hour 113 grams of liquid and solid products are obtained containing 65 grams= 57.5 per cent of hydrocarbons which are solid at room temperature.

On continuing the above experiments during a period of 5 months without any regenerating treatment and with the same catalyst, 130 grams of liquid and solid products, of which 85 grams= 65.5 per cent are solid at room temperature (boiling point above 300° C.) are obtained at a throughput of 1 liter of gas per hour per gram of cobalt. With a throughput of 2 liters of gas during the same period of operation still 116.6 grams of liquid and solid products are obtained per cubic meter, containing 44.3 grams=38 per cent of hydrocarbons which are solid at room temperature.

If, however, a catalyst is employed having the same composition but which has been obtained by rapid precipitation, then in the course of 5 weeks with a throughput of 1 liter of gas per hour per gram of cobalt an average yield of 111 grams of liquid and solid products is obtained containing 58.5 grams=52.7 per cent of hydrocarbons which are solid at room temperature and which have a boiling point above 300° C.

What we claim is:

1. A process for the production of hydrocarbons with more than one carbon atom in the molecule by conversion of carbon monoxide with hydrogen in the presence of cobalt containing catalysts comprising working in the presence of cobalt containing catalysts, in the preparation of which a reducible cobalt compound is gradually precipitated from a solution of a cobalt salt during a period of at least 3 hours.

2. A process as claimed in claim 1, characterized in that the gradual precipitation takes at least 12 hours.

3. A process as claimed in claim 1, characterized in that the gradual precipitation is carried out at room temperature.

4. A process as claimed in claim 1, characterized in that the precipitated cobalt compound is pressed into a suitable form after having been dried and prior to reduction of the cobalt compound.

5. In the process as claimed in claim 1, carrying out the conversion under a pressure up to 2 atmospheres for the preferred production of low boiling liquid hydrocarbons.

6. In the process as claimed in claim 1, carrying out the conversion under pressures between 5 and 50 atmospheres for the preferred production of solid hydrocarbons.

7. In the process as claimed in claim 1, carrying out the conversion at temperatures between 160 and 250° C.

8. In the process as claimed in claim 1, employing catalysts which contain besides cobalt also a metal selected from the class consisting of iron and nickel.

ARNO SCHEUERMANN.
KLAUS MEISENHEIMER.
ARNOLD KOTZSCHMAR.